Patented Sept. 23, 1924.

1,509,774

UNITED STATES PATENT OFFICE.

WALTER GEORGE PERKINS, OF LONDON, ENGLAND, ASSIGNOR, BY MESNE ASSIGN-MENTS, TO METALS PRODUCTION COMPANY OF NORTH AMERICA INCORPORATED, OF NEW YORK, N. Y.

TREATMENT OF COPPER ORES.

No Drawing.  Application filed August 7, 1922.  Serial No. 580,298.

*To all whom it may concern:*

Be it known that I, WALTER GEORGE PERKINS, a subject of the King of England, residing in London, England, have invented certain new and useful Improvements in the Treatment of Copper Ores, of which the following is a specification.

This invention consists of improvements in or relating to the treatment of copper ores.

In the specification of United States application Serial No. 494,381 is described a process for the treatment of ores containing oxidized copper compounds, for the recovery of the contained metal therefrom by hydrometallurgical methods. The present invention relates to a development from that process and deals with the treatment of ores which contain one or more non-oxidized compounds including sulphide of copper, with or without arsenides and antimonides of copper, or phosphorous compounds of copper.

There are many ores of copper, of which the porphyries are an example, which contain not only oxidized compounds, such as oxide, silicate or carbonate of copper, but also contain copper sulphide and other non-oxidized compounds of copper, and one object of this invention is to extract the copper effectively from such ores.

According to this invention a process for the treatment of an ore containing one or more non-oxidized compounds of copper including sulphide of copper comprises roasting the crushed ore with access of air at such a temperature that copper sulphide is converted into copper sulphate with a corresponding swelling, then heating the oxidized material in the presence of a reducing gas, for such a short time and at such a low temperature as to reduce the copper compounds without melting or alloying the copper and without fritting the gangue and so that the reduced material is obtained in a porous condition, and thereafter submitting the product to a leaching operation with an ammoniacal solvent of copper in the presence of air or oxygen.

I have found that if, during roasting, the temperature is carried high enough to convert the copper sulphide directly into copper oxide, if, for example, temperatures of 700° C. and upward are employed, the solubility of the copper material produced in the subsequent reduction is seriously impaired. I find it preferable to roast the ore at a temperature which is as low as is consistent with—

(a) The conversion of all copper sulphide present into oxidized compounds, and (b) The production of the maximum proportion of copper sulphate or basic sulphate, (such as $2CuO.SO_3$ or $3CuO.SO_3$) with the minimum of cupric oxide ($CuO$). At the same time I prefer to roast to such an extent that any iron sulphate produced from iron sulphide in the ore is converted as far as possible into iron oxide. This re-action is completed at about 530° C.

For this purpose the preferred range of temperature is between 350° C. and 600° C. but a temperature as high as 700° C. can be used without entirely sacrificing the advantage of the process.

It is preferred that the roasted ore be heated in the reducing gas to a temperature between 300° C. and 400° C. so as to reduce the copper to a porous soluble form and to eliminate a large proportion of the sulphur from the copper sulphate in the form of sulphur dioxide and sulphur trioxide.

The preferred ammoniacal liquor for dissolving the copper is one that contains for one part of $NH_3$ not less than 0.8 part of $CO_2$; the presence of $CO_2$ is not so necessary for the solution of any remaining sulphate of copper or basic sulphate of copper.

In carrying the invention into practice the ore is crushed to the necessary mesh to ensure complete decomposition of the minerals in the subsequent treatment. The crushed ore is then roasted, say for 1 to 3 hours, at a temperature between 350° C. and 500° C. to convert the sulphides of copper and iron to copper sulphate and iron sulphate. During this stage a considerable swelling occurs, which is a desirable feature. The temperature is then raised, say to 600° C. for such a time (1 to 2 hours) as to convert the sulphate of iron into oxide of iron without decomposing the copper sulphate.

Whatever the composition of the ore was to start with, the copper is now entirely in the oxidized state.

The roasted ore, while still hot, is then passed into or through an atmosphere of reducing gas. It is found that if the roasted ore be reduced at a temperature much exceeding 400° C. (say at a temperature of 500° C. or higher), the reduced copper material is more sparingly soluble in the ammoniacal liquor, and again as the heating of the material is continued the solubility of the copper diminishes.

It is preferred that reduction be carried out between 300° C. and 400° C. so as to reduce the copper to a porous soluble form and to eliminate a large proportion of the sulphur from the copper sulphate in the form of $SO_2$ and $SO_3$. The reduction takes place very rapidly and is usually complete in about 15 to 20 minutes for particles below one-twentieth of an inch in diameter. The particles of reduced copper material are in a characteristic porous condition, readily permeable to liquids. A particle adheres to the tongue and a drop of water when placed on it is absorbed instantly. After cooling, the ore is subjected to a leaching operation in an ammoniacal solution of copper with access of air, and substantially all of the copper is separated out from the solution by boiling off the ammonia.

The process of reducing the oxidized copper compounds, leaching with a solvent of copper, and separating the copper from the solution may all be carried out as described in detail in the specification of United States application Serial No. 494,381.

Where the dissolved ammonium salt of copper is combined with some radicle other than $CO_2$, such for example as a $SO_3$ radicle, the copper exists therein as a compound of ammonia, copper and that radicle; for example, copper sulphate will be present as ammonium copper sulphate. When the solution is boiled for the recovery of both copper and of ammonia, only the copper present as ammonium copper carbonate is precipitated, mainly as copper oxide. On the other hand the copper existing in solution as ammonium copper sulphate is not precipitated however long its solution may be boiled; to effect precipitation of the copper in this case, and the recovery of its associated ammonia, the equivalent of a caustic or carbonated alkali must be added, either before or during the expulsion of the ammonia when the copper is thrown down as oxide or carbonate. The equivalent of any alkali can be used which produces a soluble sulphate as the result of such reaction: lime cannot be so effectively used since some calcium sulphate would be precipitated with the copper oxide, etc. Magnesium oxide may be used after the distillation of ammonia or at the later stages of the distillation.

The following is an actual example of the application of this invention:—

The ore was a mill product from the Otavi Mine, South Africa, and contained 3.80% copper, 2.35% being in the oxidized form, and 1.405% in the sulphide form.

This material was roasted in a muffle furnace, with free access of air, for:—1¼ hours at 400° C., 2¼ additional hours at 500° C., 1½ additional hours at 525° C.

The roasted product was reduced in coal gas at a temperature of 325–350° C. for about half-an-hour, and the resulting product was ultimately leached with cupric ammonium carbonate solution, with a result that the tailings assayed 0.36% Cu. the recovery of copper in solution being 86.8%.

What I claim as my invention and desire to secure by Letters Patent is:—

1. A process for the treatment of an ore containing sulphide or copper which comprises roasting the crushed ore with access of air at such a temperature that copper sulphide is converted into copper sulphate with a corresponding swelling, then heating the oxidized material in the presence of a reducing gas for such a short time and at such a low temperature as to reduce copper compounds without melting the copper and without fritting the gangue and so that the reduced material is obtained in a porous condition, and thereafter submitting the product to a leaching operation with an ammoniacal solvent of copper in the presence of oxygen.

2. A process for the treatment of an ore containing sulphide of copper comprising roasting the crushed ore with access of air so that copper sulphide is converted to copper sulphate and any iron sulphate is converted into iron oxide but without converting copper sulphate to copper oxide, heating the oxidized material in the presence of a reducing gas for such a short time and at such a low temperature as to reduce copper compounds without melting the copper and without fritting the gangue and so that the reduced material is obtained in a porous condition, and thereafter submitting the product to a leaching operation with an ammoniacal solvent of copper in the presence of oxygen.

3. A process for the treatment of an ore containing sulphide of copper which comprises roasting the crushed ore with access of air at a temperature between 350° C. and 700° C. then heating the oxidized material in the presence of a reducing gas for such a short time and at such a low temperature as to reduce copper compounds without melting the copper and without fritting the gangue and so that the reduced material is obtained in a porous condition, and thereafter submitting the product to a leaching operation with an ammoniacal solvent of copper in the presence of oxygen.

4. A process for the treatment of an ore containing both oxidized and non-oxidized compounds of copper including sulphide of copper which comprises roasting the crushed ore with access of air at such a temperature that copper sulphide is converted into copper sulphate with a corresponding swelling, then heating the oxidized material in the presence of a reducing gas for such a short time and at such a low temperature as to reduce copper compounds without melting the copper and without fritting the gangue and so that the reduced material is obtained in a porous condition, and thereafter submitting the product to a leaching operation with an ammoniacal solvent of copper in the presence of oxygen.

5. A process for the treatment of an ore containing sulphide of copper which comprises effecting an oxidizing roast of the crushed ore at a temperature between 350° C. and 700° C. then heating the oxidized material in a reducing gas at a temperature between 300° C. and 400° C. so as to reduce the copper to a porous soluble form and leaching the product with a solvent of copper in the presence of oxygen.

6. A process for the treatment of an ore containing sulphide of copper and iron compounds which comprises effecting an oxidizing roast of the crushed ore at a temperature between 350° C., and 500° C., thereafter effecting an oxidizing roast at a higher temperature to convert the iron compounds into oxide, then heating in a reducing gas at a temperature between 300° C. and 400° C. so as to reduce the copper to a porous soluble form, and leaching the product with a solvent of copper in the presence of oxygen.

7. A process for the treatment of an ore containing sulphide of copper and iron compounds which comprises effecting an oxidizing roast of the crushed ore at a temperature between 350° C. and 500° C., thereafter effecting an oxidizing roast at a higher temperature to convert the iron compounds into oxide, then heating in a reducing gas at a temperature between 300° C. and 400° C. so as to reduce the copper to a porous soluble form, and leaching the product with an ammoniacal solvent of copper in the presence of air.

8. A process for the treatment of ores containing sulphide of copper which comprises effecting an oxidizing roast of the crushed ore at such a temperature as to convert the copper sulphide to sulphate, thereafter heating in a reducing gas so as to reduce copper compounds without melting the copper or fritting the gangue leaching the product with an ammoniacal solvent of copper in the presence of oxygen, and subjecting the solution to distillation to eliminate ammonia with the addition of an alkali of the kind described.

In testimony whereof I have signed my name to this specification in the presence of two subscribing witnesses.

WALTER GEORGE PERKINS.

Witnesses:
 Thos. J. Taplin, Jr.,
 H. C. Hawkins.